United States Patent [19]

Oishi et al.

[11] Patent Number: 4,635,877

[45] Date of Patent: Jan. 13, 1987

[54] MAGNETIC TAPE CASSETTE

[75] Inventors: Kengo Oishi; Masayoshi Moriwaki, both of Kanagawa, Japan

[73] Assignee: Fuji Photo Film Co., Ltd., Kanagawa, Japan

[21] Appl. No.: 794,035

[22] Filed: Nov. 1, 1985

[30] Foreign Application Priority Data

Nov. 2, 1984 [JP] Japan ................... 59-230432

[51] Int. Cl.$^4$ .................. B65H 23/04; G11B 15/60
[52] U.S. Cl. .................... 242/197; 226/196; 242/76
[58] Field of Search .................. 242/197–200, 242/192, 76, 157 R; 226/189, 190, 193, 196, 197; 360/132, 137

[56] References Cited

U.S. PATENT DOCUMENTS

| 3,601,654 | 8/1971 | Long et al. | 242/199 X |
| 3,843,035 | 10/1974 | Fitterer et al. | 226/195 |
| 4,376,519 | 3/1983 | Ishida et al. | 242/199 |
| 4,417,704 | 11/1983 | Oishi et al. | 242/197 |
| 4,429,823 | 2/1984 | Umehara | 226/196 |
| 4,533,969 | 8/1985 | Miyashita et al. | 360/132 |

Primary Examiner—John M. Jillions
Attorney, Agent, or Firm—Sughrue, Mion, Zinn, Macpeak & Seas

[57] ABSTRACT

A magnetic tape cassette having an improved tape running performance brought about by improvements in tape guides of the cassette. In accordance with the invention, the tape guides are made of a synthetic resin whose surface resistivity is adjusted to fall within the range of $10^3$ to $10^9$ ohm-cm. Preferably, the guides are made of a plastic resin which contains a lubricant, carbon fibers, and carbon black.

6 Claims, 1 Drawing Figure

MAGNETIC TAPE CASSETTE

BACKGROUND OF THE INVENTION

The present invention relates to a magnetic tape cassette having improved magnetic tape guides which, when brought into contact with the magnetic tape, guide the latter.

A magnetic tape cassette employed in an audio or video playback and/or recording device has magnetic tape guides which are arranged to be brought into contact with the magnetic tape to guide the latter. The tape guides are provided so as to contact the tape's rear side (base side). The tape guides are usually formed integrally with the cassette case. Alternatively, the tape guides can be provided as separate plastic resin or metal components which are fixedly mounted in the cassette case.

Most commonly, the above-described tape guides are in the form of a pipe-like hollow cylinder or in the form of a solid cylinder. On the other hand, because recently magnetic tape cassettes and recording and reproducing devices have been improved in performance and high-density recording and reproducing operations are required, tape guides made of a metal such as stainless steel have been used to maintain the tape running characteristic relatively satisfactory for long periods of time. However, the metal tape guide is disadvantageous in that it has a high manufacturing cost because its material is expensive, and moreover a heat treatment for increasing the hardness of the guide or a surface treatment for improving its surface characteristic is difficult to perform.

A tape guide formed integrally with the cassette case is of course made of the same material as the cassette case, usually a plastic resin such as acrylonitrile butadiene styrene (ABS) resin, acrylonitrile styrene (AS) resin or polypropyrene (PP) resin. A tape guide fixedly mounted in the cassette case, on the other hand, is often made of polyoxymethylene (POM). These tape guides suffer from the following difficulties:

As is well known in the art, a magnetic tape is manufactured with a strengthened and rolled polyester film as its base. Therefore, when the tape guide of plastic resin is brought into frictional contact with the tape's rear side, the tape guide is electrically charged, causing electrostatic attraction of the tape. As a result, the tape running characteristic is often less than satisfactory. If the tape guide is highly charged, the tape may even be stopped. This is a serious drawback.

SUMMARY OF THE INVENTION

An object of the invention is thus to eliminate the above-described difficulties accompanying a conventional tape guide. More specifically, an object of the invention is to provide a magnetic tape cassette having tape guides which have a low manufacturing cost, which have a structure which suppresses charging, and which can maintain the tape running characteristic satisfactory for long periods of time.

The present inventors have conducted intensive research to achieve the above-described object and found that the object can be achieved by the provision of a magnetic tape cassette with magnetic tape guides which are brought into contact with the magnetic tape guides which are brought into contact with the magnetic tape, in which, according to the invention, the magnetic tape guides are made of a synthetic resin whose electrical surface resistivity is $10^3$ to $10^9$ ohms.

BRIEF DESCRIPTION OF THE DRAWING

The single drawing FIGURE is a perspective view showing an essential component of a tape guide of the invention.

DESCRIPTION OF THE PREFERRED EMBODIMENTS

Figure 1:
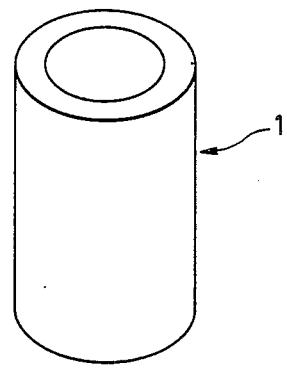

The invention will now be described in detail with reference to preferred embodiments.

The single drawing FIGURE is a perspective view showing an essential component of a tape guide of the invention.

The tape guide 1 shown in the FIGURE is of a cylindrical type and is mounted at the tape drawing opening of a video tape cassette, for instance. Its external appearance is completely the same as that of the conventional tape guide. The conventional tape guide of a video tape cassette are made of a metal such as stainless steel, as mentioned above. On the other hand, a specific feature of the invention resides in that the material of the tape guide 1 of the invention is a synthetic resin which essentially contains polyoxymethylene (POM).

The material of the tape guide 1 further contains a tetrafluoroesin such as polytetrafluoroethylene or molybdenum disulfide to make the tape guide 1 smooth, glass or carbon fibers to improve the wear resistance of the guide 1, and carbon black to adjust the electrical surface resistivity of the guide 1.

The above-described components were mixed in various mixing ratios to manufacture a plurality of tape guides 1 as shown in the FIGURE. The tape guides 1 thus manufactured were mounted in conventional video tape cassettes, after their surface resistivities were measured, to perform tape running tests.

The surface resistivity of the guides can be controlled by adjusting the quantity of carbon black. However, in the case where the material of the tape guide contains an electrically conductive component in addition to carbon black, the surface resistivity depends also on the quantity of the conductive component. As the content of carbon black increases, the surface resistivity is decreased and the surface roughness is lowered. Also, for a given value of surface resistivity, various lubricants may be added in order to improve the surface roughness and the slippage of the guide.

In the actual tape running tests, tape fast-forwarding operations and tape rewinding operations were repeatedly carried out under different environmental conditions (temperature and humidity). For measurement of recorded signal dropout, ordinary signal reproducing operations were carried out after the above-described tape fast-forwarding operations and tape rewinding operations. The results were as follows:

(1) In the case where the surface resistivity is 0 to $10^2$ ohms:

Under any of the conditions of normal temperature (about 23° C.) and normal humidity (about 55%), low temperature (about 5° C.) and low humidity (about 30%), and low temperature (about 5° C.) and high humidity (about 80%), no difficulty of the tape back-tension being increased by the charging of the tape guides was observed to the extent that the safety device in the tape recording and reproducing unit was actuated to stop the tape. However, to reduce the amount of electrical charging, the amount of the electrically conductive material (carbon black) had to be increased. As a result, the roughness of the sliding surface of the tape slide, which is brought into contact with the magnetic tape, was increased to the extent that a large quantity of power was scraped from the base surface of the tape, which powder adhered to the magnetic tape's front surface. Therefore, the frequency of signal dropout increased. Thus, such a tape guide is not practical.

(2) In the case where the surface resistivity is $10^3$ to $10^9$ ohms:

Under any of the conditions similar to those described above, the tape was not stopped. However, if the temperature was low (about 5° C.), the humidity low (about 30%), and the tape was run about twenty to sixty times, as the quantity of electrical charge increased, the tape back-tension increased, eventually stopping the tape. If the temperature was low (about 5° C.) and the humidity high (about 80%), after the tape was run about 250 to 450 times, the safety device was actuated to stop the tape.

As is apparent from the above description, if the surface resistivity of the tape guide 1 is in the range of $10^3$ to $10^9$ ohms, charging is suppressed, adverse effects on the tape running operation are eliminated, and the frequency of signal dropout is not so high as to obstruct practical operations.

In the above-described embodiment, the tape guide 1 is cylindrical and is mounted in a video tape cassette. However, the invention is not limited thereto or thereby. For instance, the tape guide may be in the form of a solid circular cylinder or plate. Also, the invention can be applied to a variety of magnetic tape cassettes other than video tape cassettes. Furthermore, the tape guide 1 may be employed as a tape guide in the recording and reproducing device.

The tape guide according to the invention is made of a material which essentially contains plastic resin, but also an electrically conductive substance. Therefore, the tape guide is low in material cost and can be readily machined when compared with the conventional tape guide made of metal. Therefore, the tape guide of the invention has a considerably low manufacturing cost, the adverse effects on the tape running operation due to charging are prevented. As described above, the material of the tape guide of the invention essentially contains plastic resin; however, it preferably includes a wear-resistant material also. Therefore, the tape running characteristic is maintained satisfactorily over long periods of use.

Moreover, because the tape guide is made of synthetic resin, tape guides of intricate configuration can be readily formed; that is, the tape guide of the invention has a wide range of application. For instance, the tape guide of the invention can be employed not only as a guide member for a magnetic tape, but also a slide support for a magnetic recording medium such as a floppy disk.

What is claimed is:

1. In a magnetic tape cassette having magnetic tape guides which are brought into contact with a magnetic tape to guide said tape running, the improvement wherein: said magnetic tape guides are made of a synthetic resin which essentially contains polyoxymethylene having an electrical surface resistivity of $10^3$ to $10^9$ ohms.

2. The magnetic tape cassette as claimed in claim 1, wherein said synthetic resin further contains a lubricant, carbon fibers, and carbon black.

3. The magnetic tape cassette as claimed in claim 1, wherein said synthetic resin further contains a tetrafluororesin.

4. The magnetic tape cassette as claimed in claim 3, wherein said tetrafluororesin is selected from the group consisting of polytetrafluoroethylene and molydbenum disulfide.

5. The magnetic tape cassette as claimed in claim 3, wherein said synthetic resin further contains a material selected from the group consisting of glass fibers and carbon fibers.

6. The magnetic tape cassette as claimed in claim 5, wherein said synthetic resin further contains carbon black.

* * * * *